US011254267B2

(12) United States Patent
Seon

(10) Patent No.: US 11,254,267 B2
(45) Date of Patent: Feb. 22, 2022

(54) VEHICLE UNDERCOVER MOUNTING BRACKET AND VEHICLE UNDERCOVER ASSEMBLY HAVING THE SAME

(71) Applicants: Hyundai Motor Company, Seoul (KR); Kia Motors Corporation, Seoul (KR)

(72) Inventor: Dong Ku Seon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/905,369

(22) Filed: Jun. 18, 2020

(65) Prior Publication Data

US 2021/0138978 A1    May 13, 2021

(30) Foreign Application Priority Data

Nov. 11, 2019 (KR) .................. 10-2019-0143691

(51) Int. Cl.
*B60R 13/08* (2006.01)
*B62D 24/00* (2006.01)
*B62D 25/20* (2006.01)

(52) U.S. Cl.
CPC .......... *B60R 13/0861* (2013.01); *B60R 13/08* (2013.01); *B60R 2013/0807* (2013.01); *B60Y 2200/145* (2013.01); *B62D 24/00* (2013.01); *B62D 25/2009* (2013.01)

(58) Field of Classification Search
CPC ........ B60R 13/0861; B60R 2013/0807; B60R 13/0838; B60R 13/08; B62D 25/2009; B62D 24/00; B60Y 2200/145
USPC ........................................ 296/39.1
See application file for complete search history.

(56) References Cited

U.S. PATENT DOCUMENTS 7,815,250 B2 * 10/2010 Oshio .................. B62D 35/02
296/204
2017/0174272 A1 * 6/2017 Yonezawa ............ B62D 27/065

* cited by examiner

*Primary Examiner* — D Glenn Dayoan
*Assistant Examiner* — Dana D Ivey
(74) *Attorney, Agent, or Firm* — Slater Matsil, LLP

(57) ABSTRACT

A vehicle undercover mounting bracket for mounting an undercover body is provided. The vehicle undercover mounting bracket includes a frame-side mounting portion mounted on a side rail of a truck frame, an undercover-side mounting portion mounted on the undercover body and spaced apart from the frame-side mounting portion in a longitudinal direction of the side rail, and a connecting portion which extends in the longitudinal direction of the side rail and connects the frame-side mounting portion and the undercover-side mounting portion.

19 Claims, 13 Drawing Sheets

VEHICLE UNDERCOVER MOUNTING BRACKET AND VEHICLE UNDERCOVER ASSEMBLY HAVING THE SAME

CROSS-REFERENCE TO RELATED APPLICATIONS

This application claims priority to Korean Patent Application No. 10-2019-0143691, filed in the Korean Intellectual Property Office on Nov. 11, 2019, which application is hereby incorporated herein by reference.

TECHNICAL FIELD

The present disclosure relates to a vehicle undercover mounting bracket and a vehicle undercover assembly having the same.

BACKGROUND

A truck is a vehicle designed for transporting loads or goods. A truck frame has a pair of side rails extending in a longitudinal direction of the truck, and being spaced apart from each other in a width direction of the truck. Each side rail may be a C-shaped beam including a web having a predetermined height, and a pair of flanges formed on the top and bottom ends of the web. In addition, the truck frame has at least one crossmember connecting the side rails. The crossmember has a length corresponding to the spacing between the side rails and a height corresponding to that of the web of each side rail so that the crossmember may fill an empty space between the webs of the side rails.

Powertrain components such as an engine and a transmission may be mounted on the truck frame, and an undercover for protecting the underside of the powertrain components may be mounted to the truck frame. While the vehicle is driving, the undercover may prevent stones flying from the ground from hitting the powertrain components such as the transmission and the engine, and protect the transmission and the engine from being contaminated by mud, calcium chloride for snow removal, etc.

The undercover may have a tunnel shape so as to cover portions of the powertrain components, such as the transmission and the engine, which are exposed below the truck frame. The undercover may be mounted to the truck frame using a plurality of mounting brackets. A plurality of chassis components, such as a urea tank and an emergency steering system, may be directly attached to the side rails of the truck frame adjacent to the undercover. At least one mounting bracket among the plurality of mounting brackets may be directly coupled to the urea tank, not being directly coupled to the truck frame, so as to avoid structural interferences with the chassis components other than the urea tank.

As the mounting bracket directly coupled to the urea tank requires a number of members, the manufacturing cost thereof may be increased, and an assembly process may be cumbersome, resulting in mis-assembly or non-assembly of the undercover.

In addition, when tubes such as a brake tube and a fuel tube are mounted on at least one side rail, it is difficult to secure a space to which a fixing means (for example, brackets) for fixing the tubes is attached, so that the tubes may not be straightly arranged along a longitudinal direction of the side rail. As a result, the tubes may be bent at a certain angle on the side rail, thereby degrading the mounting quality of the tubes.

The above information described in this background section is provided to assist in understanding the background of the inventive concept, and may include any technical concept which is not considered as the prior art that is already known to those skilled in the art.

SUMMARY

The present disclosure has been made to solve problems occurring in the prior art while advantages achieved by the prior art are maintained intact.

An embodiment of the present disclosure provides a vehicle undercover mounting bracket capable of directly coupling an undercover for protecting powertrain components such as a transmission and an engine to a truck frame, and a vehicle undercover assembly having the same.

According to an embodiment of the present disclosure, a vehicle undercover mounting bracket for mounting an undercover body on a side rail of a truck frame may include a frame-side mounting portion which is mounted on the side rail of the truck frame, an undercover-side mounting portion which is mounted on the undercover body, and is spaced apart from the frame-side mounting portion in a longitudinal direction of the side rail, and a connecting portion which extends in the longitudinal direction of the side rail, and connects the frame-side mounting portion and the undercover-side mounting portion.

The frame-side mounting portion may have a frame-side joint point joined to the side rail, the undercover-side mounting portion may have an undercover-side joint point joined to the undercover body, and the frame-side joint point may be offset from the undercover-side joint point by a predetermined gap.

The side rail may have a web extending vertically, a top flange formed on a top end of the web, and a bottom flange formed on a bottom end of the web. The frame-side mounting portion may have a first flat portion contacting the web of the side rail, and a first bead raised from the first flat portion toward the undercover body.

The undercover-side mounting portion may have a flat portion contacting the undercover body.

The connecting portion may have a second flat portion contacting the bottom flange of the side rail, and a second bead raised upwardly from the second flat portion.

The second bead may be continuously connected to the first bead.

The connecting portion may have a recess in which a strap for binding a tube to the connecting portion is tightened.

The undercover-side mounting portion may be parallel to the frame-side mounting portion, and the connecting portion may be orthogonal to the undercover-side mounting portion and the frame-side mounting portion.

According to another aspect of the present disclosure, a vehicle undercover assembly mounted between a first side rail and a second side rail of a truck frame may include an undercover body having a bottom portion, a first side portion extending upwardly from a first edge of the bottom portion, and a second side portion extending upwardly from a second edge of the bottom portion, a first front mounting bracket connecting a front end of the first side portion to the first side rail, a first rear mounting bracket connecting a rear end of the first side portion to the first side rail, a second front mounting bracket connecting a front end of the second side portion to the second side rail, and a second rear mounting bracket connecting a rear end of the second side portion to the second side rail.

The first front mounting bracket may have a first frame-side joint point joined to a first web of the first side rail, and a first undercover-side joint point joined to the front end of the first side portion. The first frame-side joint point and the first undercover-side joint point may be aligned in a width direction of the truck frame.

The second front mounting bracket may have a second frame-side joint point joined to a second web of the second side rail, and a second undercover-side joint point joined to the front end of the second side portion. The second frame-side joint point and the second undercover-side joint point may be aligned in a width direction of the truck frame.

The first rear mounting bracket may have a third frame-side joint point joined to a first web of the first side rail, and a third undercover-side joint point joined to the rear end of the first side portion. The third frame-side joint point may be offset with respect to the third undercover-side joint point in a longitudinal direction of the first side rail.

The second rear mounting bracket may have a fourth frame-side joint point joined to a second web of the second side rail, and a fourth undercover-side joint point joined to the rear end of the second side portion. The fourth frame-side joint point may be offset with respect to the fourth undercover-side joint point in a longitudinal direction of the second side rail.

At least one of the first and second rear mounting brackets may have a recess in which a strap for binding a tube is tightened.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
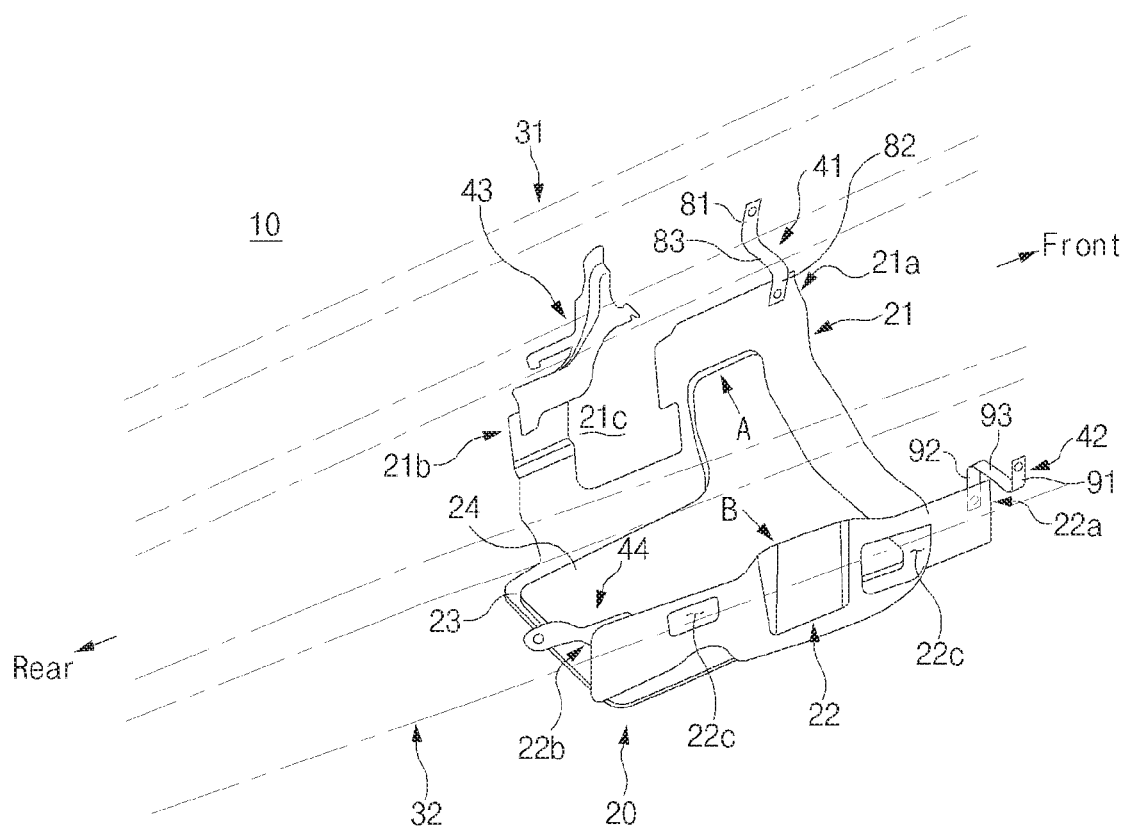
FIG. 1 illustrates a perspective view of a vehicle undercover assembly, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an undercover assembly 10 according to an exemplary embodiment of the present disclosure may include an undercover body 20, and a plurality of mounting brackets 41, 42, 43, and 44 for mounting the undercover body 20 on a truck frame 30.

The truck frame 30 may include a first side rail 31 and a second side rail 32 spaced apart from each other in a width direction of a vehicle body. The first side rail 31 and the second side rail 32 may be disposed to face each other.

Figure 2:
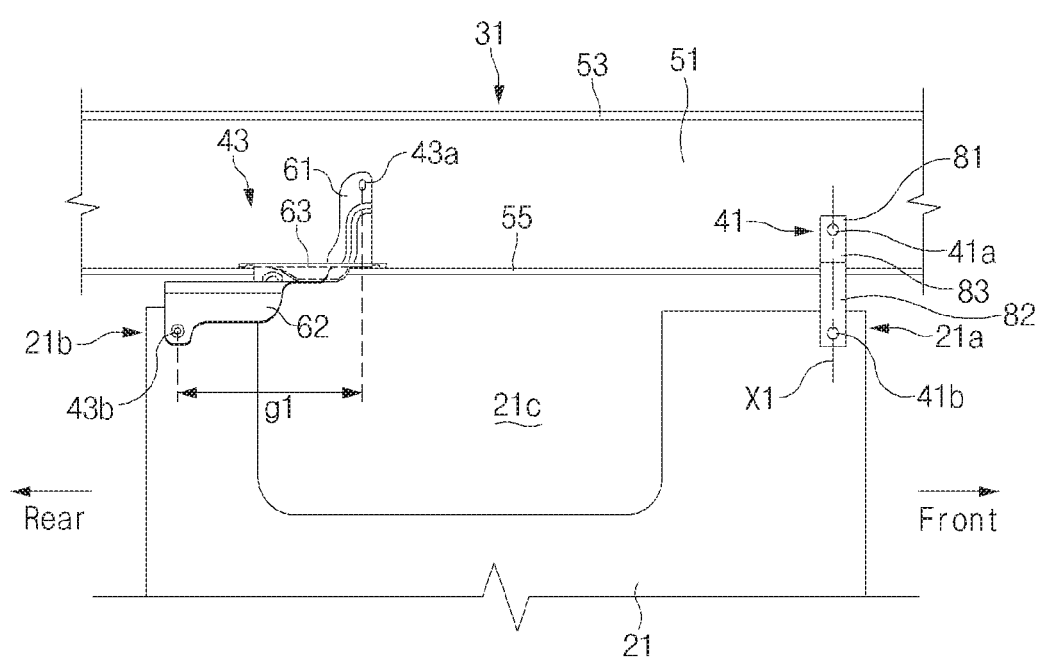
FIG. 2 illustrates a view of the vehicle undercover assembly which is viewed from a direction indicated by arrow A in FIG. 1.

The first side rail 31 may extend in a longitudinal direction of the vehicle body. The first side rail 31 may be a beam having a C-shaped or I-shaped cross section. Referring to FIG. 2, the first side rail 31 may include a first web 51 extending vertically (in a height direction of the truck frame 30), a first top flange 53 formed on a top end of the first web 51, and a first bottom flange 55 formed on a bottom end of the first web 51.

Figure 8:
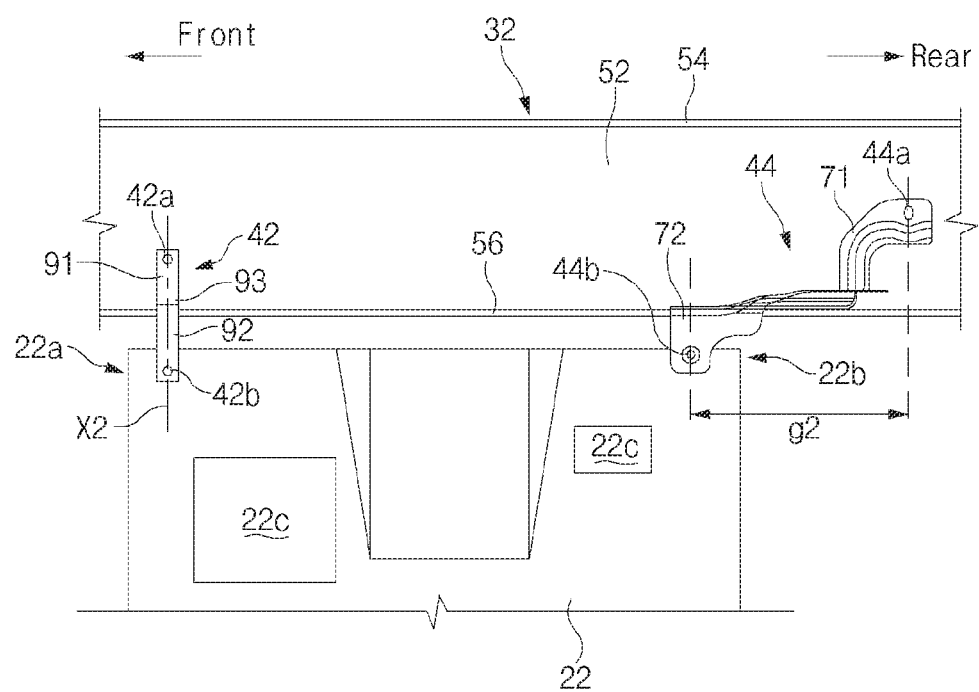
FIG. 8 illustrates a view of the vehicle undercover assembly which is viewed from a direction indicated by arrow B in FIG. 1.

The second side rail 32 may extend in the longitudinal direction of the vehicle body. The second side rail 32 may be a beam having a C-shaped or I-shaped cross section. Referring to FIG. 8, the second side rail 32 may include a second web 52 extending vertically (in the height direction of the truck frame 30), a second top flange 54 formed on a top end of the second web 52, and a second bottom flange 56 formed on a bottom end of the second web 52.

One or more crossmembers (not shown) may connect the first side rail 31 and the second side rail 32.

A plurality of external components (not shown) may be selectively mounted on the first side rail 31 and the second side rail 32 of the truck frame 30 using brackets and the like. For example, the plurality of external components may include a urea tank, an emergency steering system (ESS), a battery, a controller, a cooling module, and a chiller.

Powertrain components such as a transmission and an engine may be mounted between the first side rail 31 and the second side rail 32 of the truck frame 30 using brackets and the like, and the underside of the powertrain components may be exposed below the truck frame 30.

The undercover body 20 may be mounted between the first side rail 31 and the second side rail 32 of the truck frame 30. In particular, the undercover body 20 may cover the underside of the powertrain components exposed below the truck frame 30, thereby protecting the underside of the powertrain components.

The undercover body 20 may include a bottom portion 23, a first side portion 21 extending upwardly from a first edge of the bottom portion 23, and a second side portion 22 extending upwardly from a second edge of the bottom portion 23.

The bottom portion 23 may be located below the truck frame 30, and the bottom portion 23 may cover the bottom of the powertrain components such as the transmission and the engine. For example, a damping material 24 may be attached to a top surface of the bottom portion 23 so that the bottom of the powertrain components may be supported by the damping material 24.

The first side portion 21 may be mounted on the first side rail 31 using the plurality of mounting brackets 41 and 43, and the first side portion 21 may have one or more first openings 21c to avoid interference with other components. A front end 21a of the first side portion 21 may be mounted on the first side rail 31 using a first front mounting bracket 41, and a rear end 21b of the first side portion 21 may be mounted on the first side rail 31 using a first rear mounting bracket 43.

The second side portion 22 may be mounted on the second side rail 32 using the plurality of mounting brackets 42 and 44, and the second side portion 22 may have one or more second openings 22c to avoid interference with other components. A front end 22a of the second side portion 22 may be mounted on the second side rail 32 using a second front mounting bracket 42, and a rear end 22b of the second side portion 22 may be mounted on the second side rail 32 using a second rear mounting bracket 44.

The front end 21a of the first side portion 21 and the front end 22a of the second side portion 22 may face the front of the vehicle, and the rear end 21b of the first side portion 21 and the rear end 22b of the second side portion 22 may face the rear of the vehicle.

The plurality of brackets 41, 42, 43, and 44 may connect the ends 21a, 21b, 22a, and 22b of the undercover body 20 to the corresponding side rails 31 and 32.

Referring to FIG. 2, the first front mounting bracket 41 may connect the front end 21a of the first side portion 21 to the first web 51 of the first side rail 31. The first front mounting bracket 41 may have a bent shape conforming to the front end 21a of the first side portion 21, the first web 51 of the first side rail 31, and the first bottom flange 55 of the first side rail 31. Specifically, the first front mounting bracket 41 may include a frame-side mounting portion 81 which is mounted on the first web 51 of the first side rail 31 of the truck frame 30, an undercover-side mounting portion 82 which is mounted on the front end 21a of the first side portion 21 of the undercover body 20, and a connecting portion 83 connecting the frame-side mounting portion 81 and the undercover-side mounting portion 82. The first front mounting bracket 41 may have a first frame-side joint point 41a joined to the first web 51 of the first side rail 31 of the truck frame 30 using fasteners, welding, and/or the like, and a first undercover-side joint point 41b joined to the front end 21a of the first side portion 21 of the undercover body 20 using fasteners, welding, and/or the like. The first frame-side joint point 41a may be located in a top end of the frame-side mounting portion 81, and the first undercover-side joint point 41b may be located in a bottom end of the undercover-side mounting portion 82. The first frame-side joint point 41a and the first undercover-side joint point 41b may be aligned in a width direction of the truck frame 30, so that a virtual line X1 connecting the first frame-side joint point 41a and the first undercover-side joint point 41b may be parallel to the width of the truck frame 30.

Referring to FIG. 8, the second front mounting bracket 42 may connect the front end 22a of the second side portion 22 to the second web 52 of the second side rail 32. The second front mounting bracket 42 may have a bent shape conforming to the front end 22a of the second side portion 22, the second web 52 of the second side rail 32, and the second bottom flange 56 of the second side rail 32. Specifically, the second front mounting bracket 42 may include a frame-side mounting portion 91 which is mounted on the second web 52 of the second side rail 32 of the truck frame 30, an undercover-side mounting portion 92 which is mounted on the front end 22a of the second side portion 22 of the undercover body 20, and a connecting portion 93 connecting the frame-side mounting portion 91 and the undercover-side mounting portion 92. The second front mounting bracket 42 may have a second frame-side joint point 42a joined to the second web 52 of the second side rail 32 using fasteners, welding, and/or the like, and a second undercover-side joint point 42b joined to the front end 22a of the second side portion 22 using fasteners, welding, and/or the like. The second frame-side joint point 42a may be located in a top end of the frame-side mounting portion 91, and the second undercover-side joint point 42b may be located in a bottom end of the undercover-side mounting portion 92. The second frame-side joint point 42a and the second undercover-side joint point 42b may be aligned in the width direction of the truck frame 30, so that a virtual line X2 connecting the second frame-side joint point 42a and the second undercover-side joint point 42b may be parallel to the width of the truck frame 30.

Referring to FIG. 2, the first rear mounting bracket 43 may connect the rear end 21b of the first side portion 21 to the first web 51 of the first side rail 31. Referring to FIGS. 3 to 7, the first rear mounting bracket 43 may have a third frame-side joint point 43a joined to the first web 51 of the first side rail 31 of the truck frame 30 using fasteners, welding, and/or the like, and a third undercover-side joint point 43b joined to the rear end 21b of the first side portion 21 of the undercover body 20 using fasteners, welding, and/or the like. The first rear mounting bracket 43 may include a frame-side mounting portion 61 which is mounted on the first side rail 31 of the truck frame 30, an undercover-side mounting portion 62 which is mounted on the rear end 21b of the first side portion 21 of the undercover body 20, and a connecting portion 63 connecting the frame-side mounting portion 61 and the undercover-side mounting portion 62.

The frame-side mounting portion 61 may extend along the first web 51 of the first side rail 31. The frame-side mounting portion 61 may have a first flat portion 61a contacting the first web 51, and a first bead 61b raised from the first flat portion 61a toward the undercover body 20. The third frame-side joint point 43a may be a hole or slot located in a top end of the frame-side mounting portion 61. As a fastener such as a bolt is fastened to the third frame-side joint point 43a and the first web 51 of the first side rail 31, the frame-side mounting portion 61 may be mounted on the first web 51 of the first side rail 31.

The undercover-side mounting portion 62 may extend along a rear edge of the first side portion 21. The undercover-side mounting portion 62 may be flat to tightly contact the rear end 21b of the first side portion 21. The third undercover-side joint point 43b may be a hole or slot located in a bottom end of the undercover-side mounting portion 62. As a fastener such as a bolt is fastened to the third undercover-side joint point 43b and the rear end 21b of the first side portion 21, the undercover-side mounting portion 62 may be mounted on the rear end 21b of the first side portion 21.

The connecting portion 63 may extend in a longitudinal direction of the first side rail 31. The connecting portion 63 may have a second flat portion 63a contacting the first bottom flange 55 of the first side rail 31, and a second bead 63b raised upwardly from the second flat portion 63a. In particular, the second bead 63b of the connecting portion 63 may be continuously connected to the first bead 61b of the frame-side mounting portion 61, so that stiffness of the first rear mounting bracket 43 may be improved.

Figure 7:
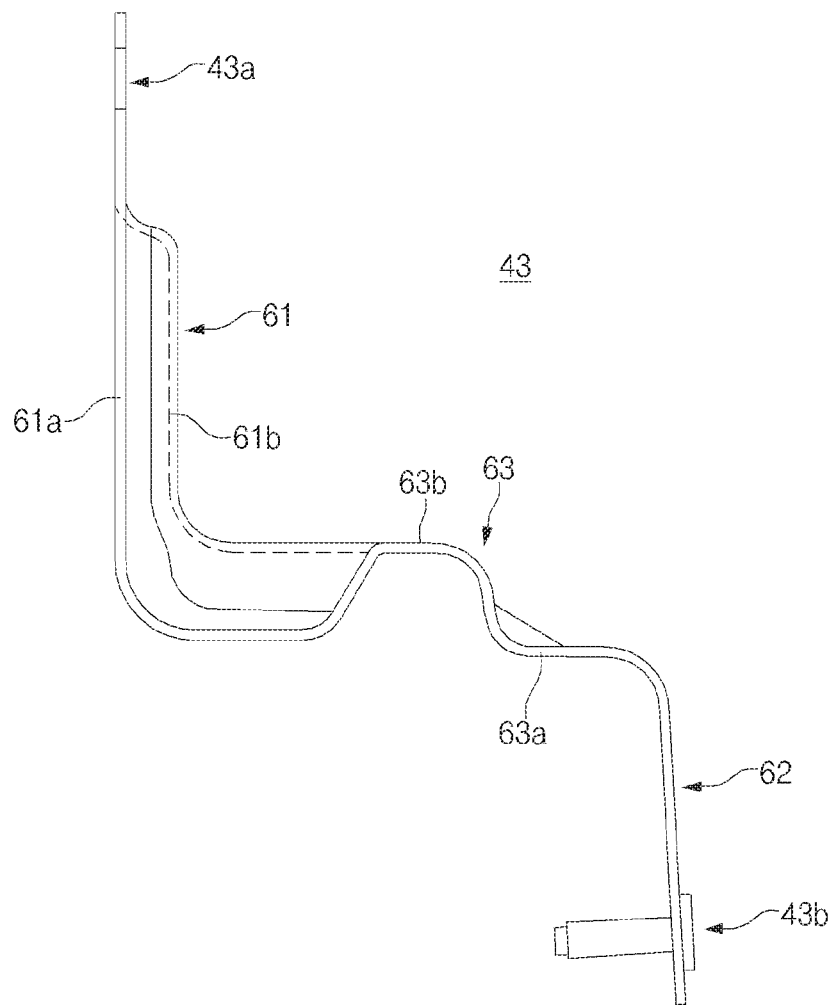
FIG. 7 illustrates a view of the first rear mounting bracket which is viewed from a direction indicated by arrow D in FIG. 5.

Referring to FIG. 7, the undercover-side mounting portion 62 may be parallel to the frame-side mounting portion 61, and the connecting portion 63 may be orthogonal to the frame-side mounting portion 61 and the undercover-side mounting portion 62.

To allow the frame-side mounting portion 61 to be spaced apart from the undercover-side mounting portion 62 in the longitudinal direction of the first side rail 31, the connecting portion 63 may extend in the longitudinal direction of the first side rail 31. In particular, the third frame-side joint point 43a may be offset with respect to the third undercover-side joint point 43b by a predetermined gap g1 in the longitudinal direction of the first side rail 31. For example, the third frame-side joint point 43a may be offset from the third undercover-side joint point 43b toward the front of the vehicle. That is, the frame-side mounting portion 61 may be disposed closer to the front of the vehicle than the undercover-side mounting portion 62.

As the rear end 21b of the first side portion 21 of the undercover body 20 is coupled to the first side rail 31 of the truck frame 30 using the first rear mounting bracket 43, in particular, the frame-side mounting portion 61 and the undercover-side mounting portion 62 are spaced apart from each other, interference with brackets and other components for mounting the powertrain components (the transmission, the engine, etc.) to the truck frame 30 may be minimized.

The connecting portion 63 of the first rear mounting bracket 43 may have one or more recesses 64 and 65 in which straps 66 and 67 for binding tubes such as a brake tube and a fuel tube to the connecting portion 63 are tightened.

Figure 3:
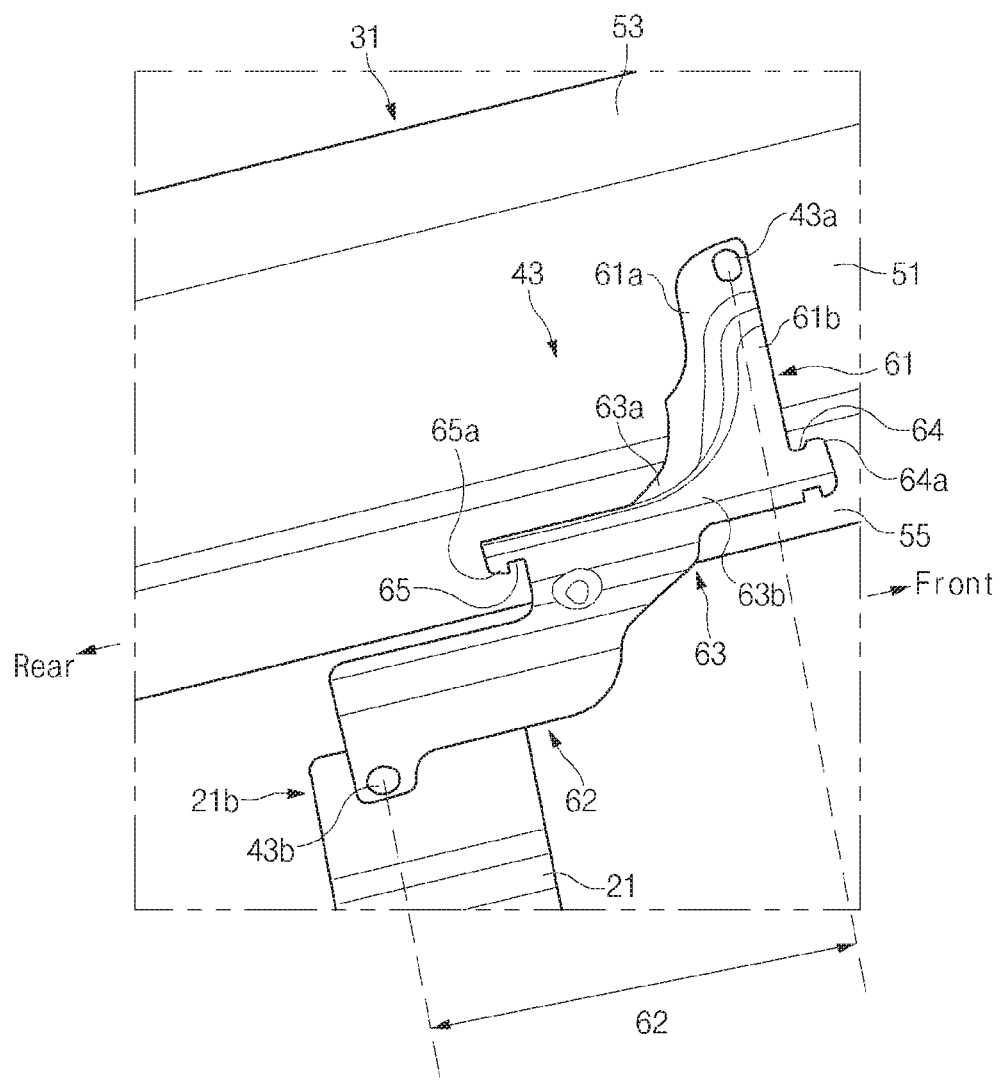
FIG. 3 illustrates a perspective view of a structure in which a first rear mounting bracket is mounted between a rear end of an undercover body and a first side rail, according to an exemplary embodiment of the present disclosure.

Referring to FIG. 3, the first rear mounting bracket 43 may have a first recess 64 formed in a front end of the connecting portion 63 and a second recess 65 formed in a rear end of the connecting portion 63. The first recess 64 may be defined by a projection 64a protruding from the front end of the connecting portion 63 toward the front of the vehicle, and the second recess 65 may be defined by a projection 65a protruding from the rear end of the connecting portion 63 toward the rear of the vehicle.

Figure 4:
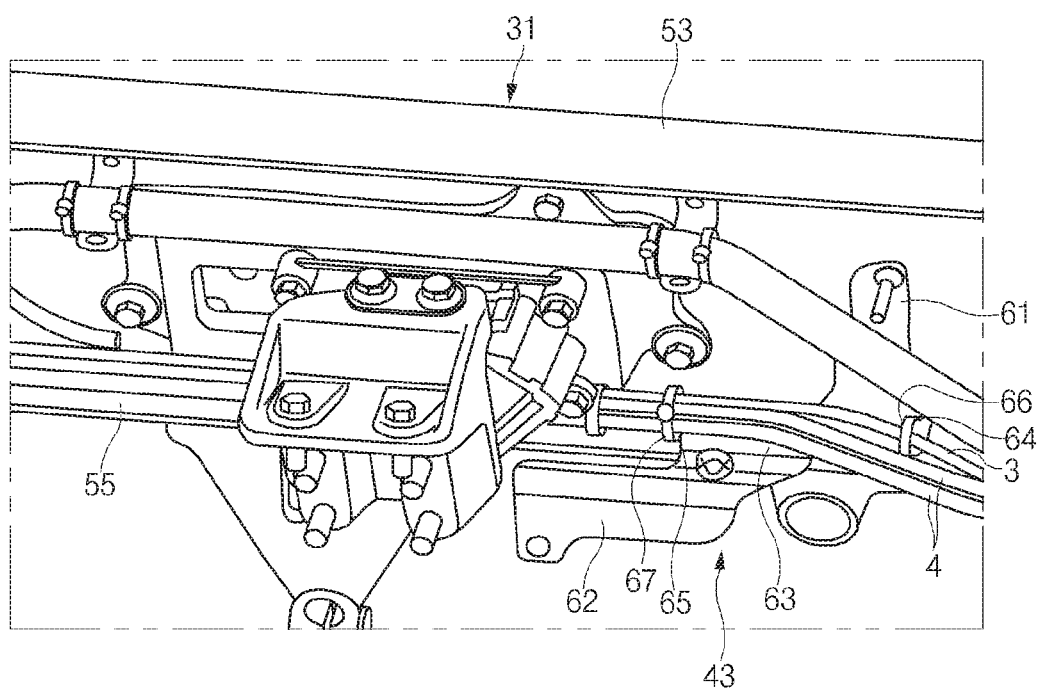
FIG. 4 illustrates a perspective view of a state in which a plurality of tubes are bound to a first rear mounting bracket by straps, according to an exemplary embodiment of the present disclosure.
Figure 5:
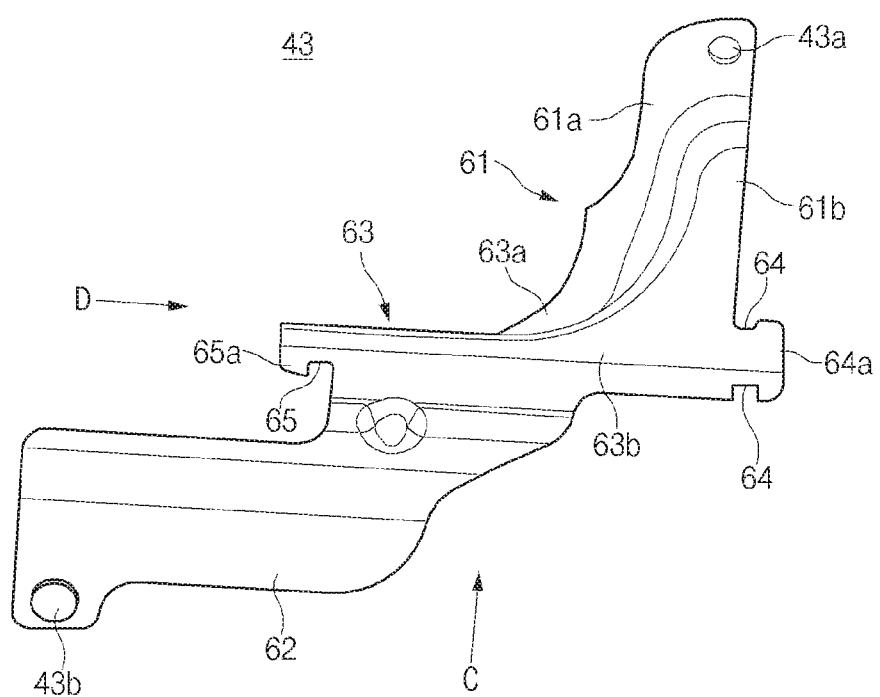
FIG. 5 illustrates a perspective view of a first rear mounting bracket, according to an exemplary embodiment of the present disclosure.
Figure 6:
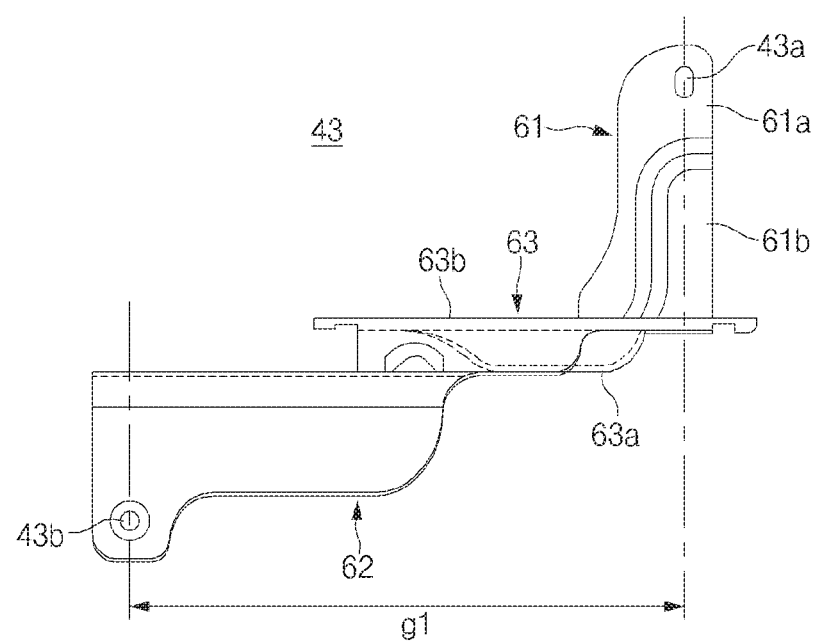
FIG. 6 illustrates a view of the first rear mounting bracket which is viewed from a direction indicated by arrow C in FIG. 5.

Referring to FIG. 4, a first strap 66 may be tightened around a fuel tube 3 and the first recess 64 so that the fuel tube 3 may be bound to the connecting portion 63 of the first rear mounting bracket 43. As the fuel tube 3 is bound to the connecting portion 63 of the first rear mounting bracket 43 by the first strap 66 and the first recess 64, the fuel tube 3 may be arranged along the first bottom flange 55 of the first side rail 31 in the longitudinal direction. A second strap 67 may be tightened around two brake tubes 4 and the second recess 65 so that the brake tubes 4 may be bound to the connecting portion 63 of the first rear mounting bracket 43. As the brake tubes 4 are bound to the connecting portion 63 of the first rear mounting bracket 43 by the second strap 67 and the second recess 65, the brake tubes 4 may be arranged along the first bottom flange 55 of the first side rail 31 in the longitudinal direction. As one or more tubes 3 and 4 are bound to the first rear mounting bracket 43 by the straps 66 and 67 and the recesses 64 and 65, one or more tubes 3 and 4 may be arranged in a straight line on the first bottom flange 55 of the first side rail 31 of the truck frame 30 along the longitudinal direction of the first side rail 31, so that the mounting quality of the tubes 3 and 4 may be improved.

Referring to FIG. 8, the second rear mounting bracket 44 may connect the rear end 22b of the second side portion 22 to the second web 52 of the second side rail 32. Referring to FIGS. 9 to 13, the second rear mounting bracket 44 may have a fourth frame-side joint point 44a joined to the second web 52 of the second side rail 32 of the truck frame 30 using fasteners, welding, and/or the like, and a fourth undercover-side joint point 44b joined to the rear end 22b of the second side portion 22 of the undercover body 20 using fasteners, welding, and/or the like. The second rear mounting bracket 44 may include a frame-side mounting portion 71 which is mounted on the second side rail 32 of the truck frame 30, an undercover-side mounting portion 72 which is mounted on the rear end 22b of the second side portion 22 of the undercover body 20, and a connecting portion 73 connecting the frame-side mounting portion 71 and the undercover-side mounting portion 72.

The frame-side mounting portion 71 may extend along the second web 52 of the second side rail 32. The frame-side mounting portion 71 may have a first flat portion 71a contacting the second web 52, and a first bead 71b raised from the first flat portion 71a toward the undercover body 20. The fourth frame-side joint point 44a may be a hole or slot located in a top end of the frame-side mounting portion 71. As a fastener such as a bolt is fastened to the fourth frame-side joint point 44a and the second web 52 of the second side rail 32, the frame-side mounting portion 71 may be mounted on the second web 52 of the second side rail 32.

The undercover-side mounting portion 72 may extend along a rear edge of the second side portion 22. The undercover-side mounting portion 72 may have a flat portion 72a contacting the rear end 22b of the second side portion 22. The fourth undercover-side joint point 44b may be a hole or slot located in a bottom end of the undercover-side mounting portion 72. As a fastener such as a bolt is fastened to the fourth undercover-side joint point 44b and the rear end 22b of the second side portion 22, the undercover-side mounting portion 72 may be mounted on the rear end 22b of the second side portion 22.

The connecting portion 73 may extend along the second bottom flange 56 of the second side rail 32. The connecting portion 73 may have a second flat portion 73a contacting the second bottom flange 56 of the second side rail 32, and a second bead 73b raised upwardly from the second flat portion 73a. In particular, the second bead 73b of the connecting portion 73 may be continuously connected to the first bead 71b of the frame-side mounting portion 71, so that stiffness of the second rear mounting bracket 44 may be improved.

Figure 12:
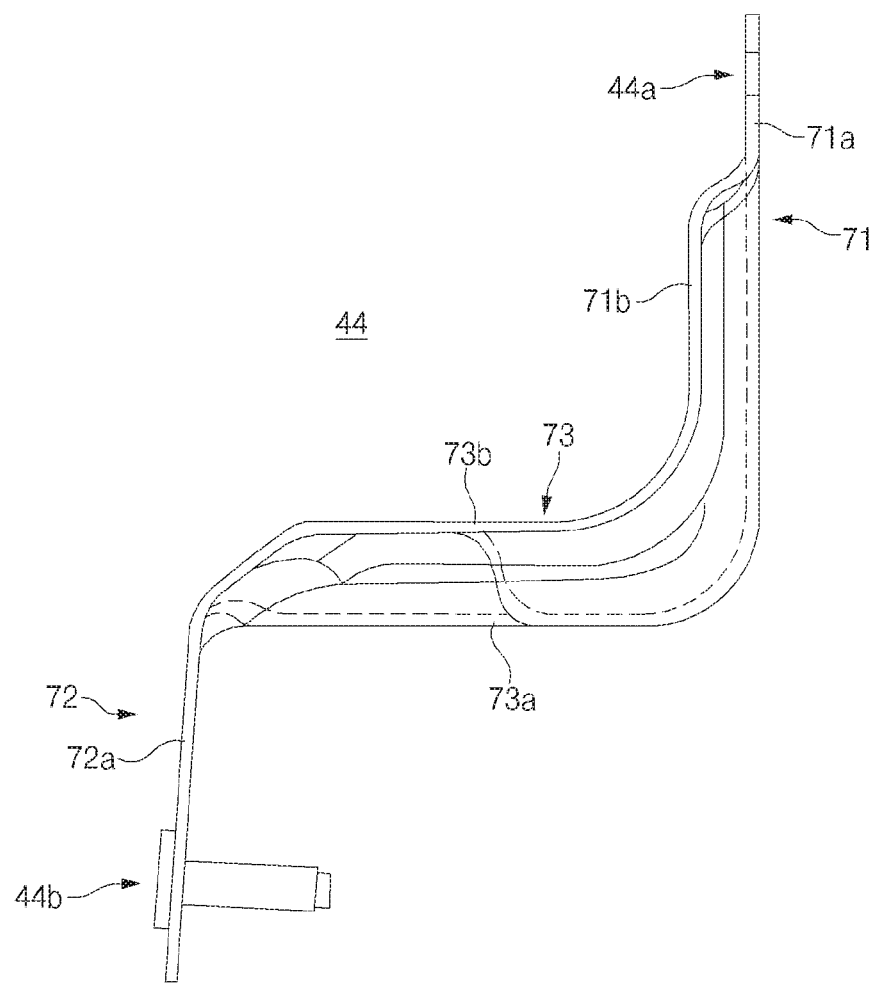
FIG. 12 illustrates a view of the second rear mounting bracket which is viewed from a direction indicated by arrow F in FIG. 10.
Figure 13:
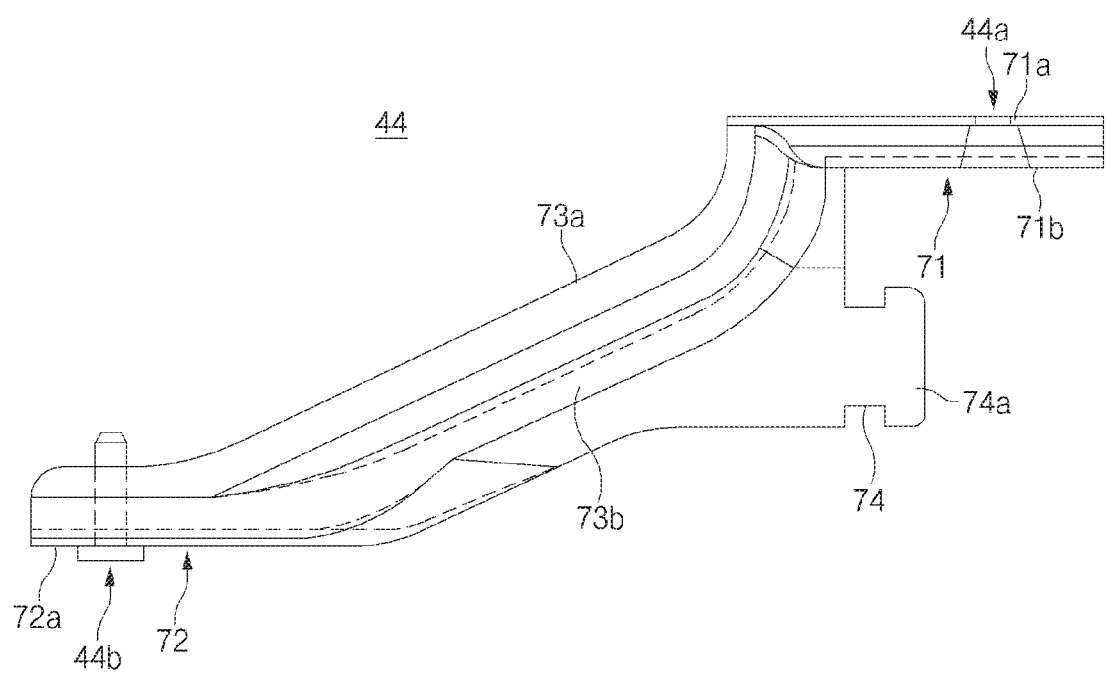
FIG. 13 illustrates a view of the second rear mounting bracket which is viewed from a direction indicated by arrow G in FIG. 10.

Referring to FIG. 12, the undercover-side mounting portion 72 may be parallel to the frame-side mounting portion 71, and the connecting portion 73 may be orthogonal to the frame-side mounting portion 71 and the undercover-side mounting portion 72.

To allow the frame-side mounting portion 71 to be spaced apart from the undercover-side mounting portion 72 in a longitudinal direction of the second side rail 32, the connecting portion 73 may extend in the longitudinal direction of the second side rail 32. In particular, the fourth frame-side joint point 44a may be offset with respect to the fourth undercover-side joint point 44b by a predetermined gap g2 in the longitudinal direction of the second side rail 32. For example, the fourth frame-side joint point 44a may be offset from the fourth undercover-side joint point 44b toward the rear of the vehicle. That is, the frame-side mounting portion 71 may be disposed closer to the rear of the vehicle than the undercover-side mounting portion 72.

As the rear end 22b of the second side portion 22 of the undercover body 20 is coupled to the second side rail 32 of the truck frame 30 using the second rear mounting bracket 44, in particular, the frame-side mounting portion 71 and the undercover-side mounting portion 72 are spaced apart from each other, interference with brackets and other components for mounting the powertrain components (the transmission, the engine, etc.) to the truck frame 30 may be minimized.

The second rear mounting bracket 44 may have at least one recess 74 in which a strap (not shown) for binding the brake tube, the fuel tube, etc. is tightened.

Figure 9:
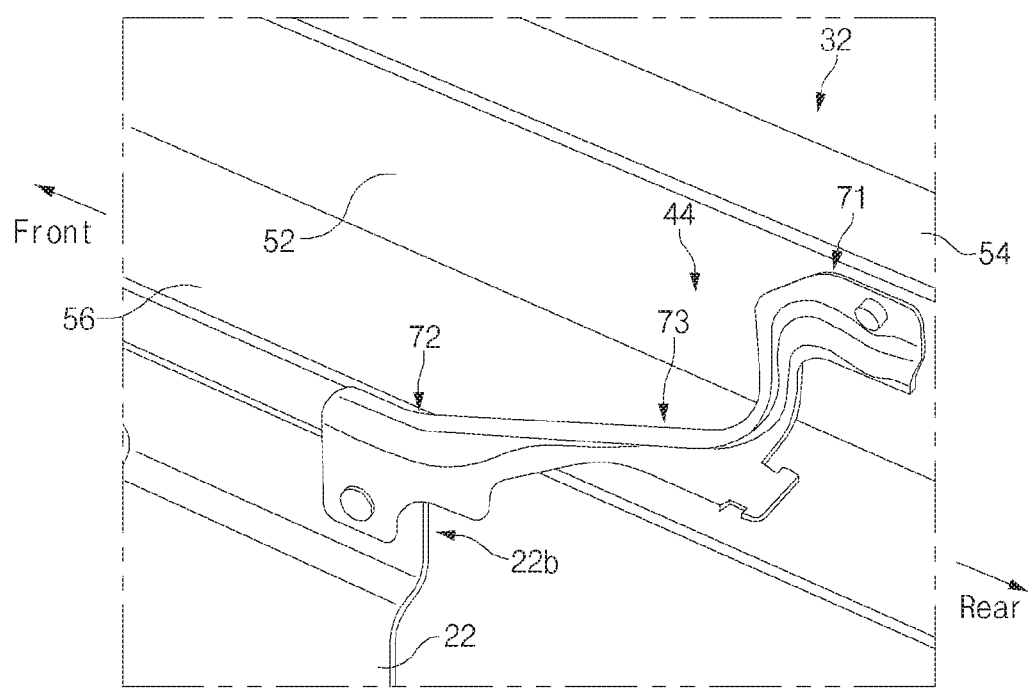
FIG. 9 illustrates a perspective view of a structure in which a second rear mounting bracket is mounted between a rear end of an undercover body and a second side rail, according to an exemplary embodiment of the present disclosure.
Figure 10:
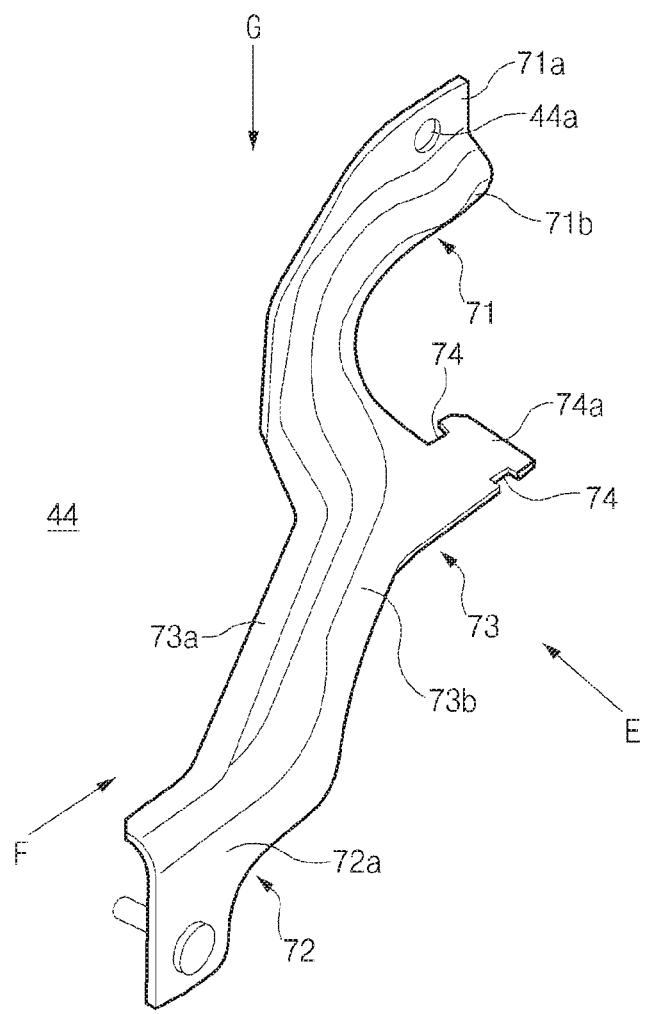
FIG. 10 illustrates a perspective view of a second rear mounting bracket, according to an exemplary embodiment of the present disclosure.
Figure 11:
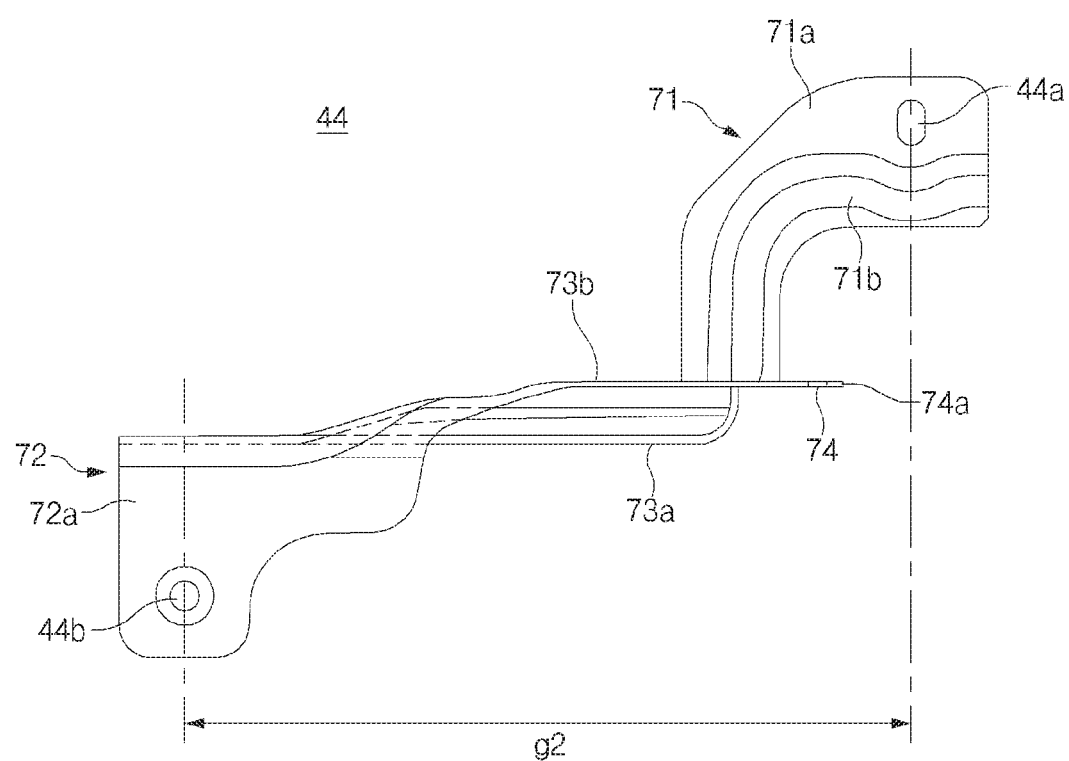
FIG. 11 illustrates a view of the second rear mounting bracket which is viewed from a direction indicated by arrow E in FIG. 10.

Referring to FIGS. 9 and 10, the second rear mounting bracket 44 may have the recess 74 formed in a rear end of the connecting portion 73. The recess 74 may be defined by a projection 74a protruding from the rear end of the connecting portion 73 toward the rear of the vehicle.

According to exemplary embodiments of the present disclosure, as all of the ends 21a, 21b, 22a, and 22b of the undercover body 20 are mounted on the truck frame 30 using the plurality of mounting brackets 41, 42, 43, and 44, the mounting stiffness of the undercover body 20 as well as the assemble-ability of the undercover body 20 may be significantly improved.

As set forth above, according to exemplary embodiments of the present disclosure, as the rear end of the first side portion of the undercover body is coupled to the first side rail of the truck frame using the first rear mounting bracket, and the frame-side mounting portion and the undercover-side mounting portion of the first rear mounting bracket are spaced apart from each other, interference with brackets and other components for mounting the powertrain components to the truck frame may be minimized.

According to exemplary embodiments of the present disclosure, as the rear end of the second side portion of the undercover body is coupled to the second side rail of the truck frame using the second rear mounting bracket, and the frame-side mounting portion and the undercover-side mounting portion of the second rear mounting bracket are spaced apart from each other, interference with brackets and other components for mounting the powertrain components to the truck frame may be minimized.

According to exemplary embodiments of the present disclosure, as one or more tubes are bound to the first and second rear mounting brackets by the straps and the recesses, the tubes may be arranged in a straight line on the bottom flange of the side rail of the truck frame along the longitudinal direction of the side rail, so that the mounting quality of the tubes may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle undercover mounting bracket for mounting an undercover body, the vehicle undercover mounting bracket comprising:
   a frame-side mounting portion mounted on a side rail of a truck frame, the frame-side mounting portion having a frame-side joint point joined to the side rail;
   an undercover-side mounting portion having an undercover-side joint point joined to the undercover body and spaced apart from the frame-side mounting portion in a longitudinal direction of the side rail, wherein the frame-side joint point is offset from the undercover-side joint point by a predetermined gap; and
   a connecting portion which extends in the longitudinal direction of the side rail and connects the frame-side mounting portion and the undercover-side mounting portion.

2. The vehicle undercover mounting bracket according to claim 1, wherein:
   the side rail has a web extending vertically, a top flange formed on a top end of the web, and a bottom flange formed on a bottom end of the web; and
   the frame-side mounting portion has a first flat portion contacting the web of the side rail and a first bead raised from the first flat portion toward the undercover body.

3. The vehicle undercover mounting bracket according to claim 2, wherein the undercover-side mounting portion has a flat portion contacting the undercover body.

4. The vehicle undercover mounting bracket according to claim 2, wherein the connecting portion has a second flat portion contacting the bottom flange of the side rail and a second bead raised upwardly from the second flat portion.

5. The vehicle undercover mounting bracket according to claim 4, wherein the second bead is continuously connected to the first bead.

6. The vehicle undercover mounting bracket according to claim 2, wherein the connecting portion has a recess in which a strap for binding a tube to the connecting portion is configured to be tightened.

7. The vehicle undercover mounting bracket according to claim 1, wherein:
   the undercover-side mounting portion is parallel to the frame-side mounting portion; and
   the connecting portion is orthogonal to the undercover-side mounting portion and the frame-side mounting portion.

8. A vehicle undercover assembly mounted between a first side rail and a second side rail of a truck frame, the vehicle undercover assembly comprising:
   an undercover body having a bottom portion, a first side portion extending upwardly from a first edge of the bottom portion, and a second side portion extending upwardly from a second edge of the bottom portion;
   a first front mounting bracket connecting a front end of the first side portion to the first side rail, the first front mounting bracket having a first frame-side joint point joined to a first web of the first side rail and a first undercover-side joint point joined to the front end of the first side portion, wherein the first frame-side joint point and the first undercover-side joint point are aligned in a width direction of the truck frame;

a first rear mounting bracket connecting a rear end of the first side portion to the first side rail;

a second front mounting bracket connecting a front end of the second side portion to the second side rail; and a second rear mounting bracket connecting a rear end of the second side portion to the second side rail.

9. The vehicle undercover assembly according to claim 8, wherein:

the second front mounting bracket has a second frame-side joint point joined to a second web of the second side rail, and a second undercover-side joint point joined to the front end of the second side portion; and the second frame-side joint point and the second undercover-side joint point are aligned in the width direction of the truck frame.

10. The vehicle undercover assembly according to claim 8, wherein:

the first rear mounting bracket has a third frame-side joint point joined to the first web of the first side rail, and a third undercover-side joint point joined to the rear end of the first side portion; and the third frame-side joint point is offset with respect to the third undercover-side joint point in a longitudinal direction of the first side rail.

11. The vehicle undercover assembly according to claim 8, wherein:

the second rear mounting bracket has a fourth frame-side joint point joined to a second web of the second side rail, and a fourth undercover-side joint point joined to the rear end of the second side portion; and the fourth frame-side joint point is offset with respect to the fourth undercover-side joint point in a longitudinal direction of the second side rail.

12. The vehicle undercover assembly according to claim 8, wherein the first rear mounting bracket has a recess in which a strap for binding a tube is configured to be tightened.

13. The vehicle undercover assembly according to claim 8, further comprising a damping material on a top surface of the bottom portion of the undercover body.

14. The vehicle undercover assembly according to claim 8, wherein the second rear mounting bracket has a recess in which a strap for binding a tube is configured to be tightened.

15. A vehicle undercover assembly comprising:

an undercover body having a bottom portion, a first side portion, and a second side portion;

a first front mounting bracket connecting a front end of the first side portion to a first side rail of a vehicle frame, the first front mounting bracket having a first frame-side joint point joined to a first web of the first side rail and a first undercover-side joint point joined to the front end of the first side portion, wherein the first frame-side joint point and the first undercover-side joint point are aligned in a width direction of the vehicle frame; and a first rear mounting bracket connecting a rear end of the first side portion to the first side rail.

16. The vehicle undercover assembly according to claim 15, further comprising:

a second front mounting bracket connecting a front end of the second side portion to a second side rail of the vehicle frame, wherein the second side rail is spaced apart from the first side rail in the width direction of the vehicle frame; and a second rear mounting bracket connecting a rear end of the second side portion to the second side rail.

17. The vehicle undercover assembly according to claim 16, wherein:

the second front mounting bracket has a second frame-side joint point joined to a second web of the second side rail, and a second undercover-side joint point joined to the front end of the second side portion; and the second frame-side joint point and the second undercover-side joint point are aligned in the width direction of the vehicle frame.

18. The vehicle undercover assembly according to claim 17, wherein:

the first rear mounting bracket has a third frame-side joint point joined to the first web of the first side rail, and a third undercover-side joint point joined to the rear end of the first side portion;

the third frame-side joint point is offset with respect to the third undercover-side joint point in a longitudinal direction of the first side rail;

the second rear mounting bracket has a fourth frame-side joint point joined to the second web of the second side rail, and a fourth undercover-side joint point joined to the rear end of the second side portion; and the fourth frame-side joint point is offset with respect to the fourth undercover-side joint point in the longitudinal direction of the second side rail.

19. The vehicle undercover assembly according to claim 15, wherein the first front mounting bracket comprises:

a frame-side mounting portion mounted on the first side rail;

an undercover-side mounting portion mounted on the undercover body and spaced apart from the frame-side mounting portion in a longitudinal direction of the first side rail; and a connecting portion which extends in the longitudinal direction of the first side rail and connects the frame-side mounting portion and the undercover-side mounting portion.

* * * * *